United States Patent
Forster

(10) Patent No.: US 10,762,753 B2
(45) Date of Patent: Sep. 1, 2020

(54) METHODS AND SYSTEMS FOR DETERMINING THE TIME AT WHICH A SEAL WAS BROKEN

(71) Applicant: Avery Dennison Retail Information Services, LLC, Mentor, OH (US)

(72) Inventor: Ian James Forster, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 20 days.

(21) Appl. No.: 14/568,480

(22) Filed: Dec. 12, 2014

(65) Prior Publication Data

US 2016/0171850 A1 Jun. 16, 2016

(51) Int. Cl.
*G08B 13/12* (2006.01)
*B65D 55/02* (2006.01)
(Continued)

(52) U.S. Cl.
CPC ............ *G08B 13/126* (2013.01); *A61J 1/035* (2013.01); *A61J 7/0436* (2015.05); *B65D 55/028* (2013.01); *G01N 27/04* (2013.01)

(58) Field of Classification Search
CPC .... G08B 13/126; G01N 27/04; B65D 55/028; A61J 7/0436; A61J 1/035
(Continued)

(56) References Cited

U.S. PATENT DOCUMENTS

| 4,429,792 A | 2/1984 | Machbitz |
| 4,526,474 A | 7/1985 | Simon |

(Continued)

FOREIGN PATENT DOCUMENTS

| CN | 202046575 | * 11/2011 | ............ B65D 77/30 |
| EP | 1758050 | 2/2007 | |

(Continued)

OTHER PUBLICATIONS

International Search Report and Written Opinion dated Mar. 11, 2016 for International Application No. PCT/US2015/064888 filed Dec. 10, 2015.
(Continued)

*Primary Examiner* — Jeff W Natalini
(74) *Attorney, Agent, or Firm* — Avery Dennison Retail Information Services, LLC

(57) ABSTRACT

Systems and methods are provided for determining when the seal of a sealed container was broken. Such can include a sealed container with a seal that separates an interior of the container from the outside environment. An environmentally sensitive conductor of an electrical circuit is positioned within the interior of the sealed container. The conductor has an electrical property with a known initial value that changes in a predictable manner as a function of time and exposure to the outside environment. Accordingly, breaking the seal and exposing the conductor to the environment causes the electrical property of the conductor to change. When a present value of the electrical property is determined, it may be used in combination with the initial value and the expected change in the value over time in order to determine the time at which the seal was broken.

16 Claims, 4 Drawing Sheets

(51) Int. Cl.
  *A61J 1/03* (2006.01)
  *A61J 7/04* (2006.01)
  *G01N 27/04* (2006.01)

(58) Field of Classification Search
  USPC .................................................. 324/691–724
  See application file for complete search history.

(56) References Cited

U.S. PATENT DOCUMENTS

| | | | |
|---|---|---|---|
| 4,617,557 | A | 10/1986 | Gordon |
| 4,660,991 | A | 4/1987 | Simon |
| 5,181,189 | A | 1/1993 | Hafner et al. |
| 5,313,439 | A | 5/1994 | Albeck |
| 5,412,372 | A | 5/1995 | Parkhurst et al. |
| 5,642,731 | A | 7/1997 | Kehr et al. |
| 5,836,474 | A | 11/1998 | Wessberg |
| 5,871,831 | A | 2/1999 | Zeiter et al. |
| 5,905,653 | A | 5/1999 | Higham et al. |
| 6,294,999 | B1 | 9/2001 | Yarin et al. |
| 6,339,732 | B1 | 1/2002 | Phoon et al. |
| 6,411,567 | B1 | 6/2002 | Niemiec et al. |
| 6,664,887 | B1* | 12/2003 | Fuchs ................... B65D 81/24 |
| | | | 340/309.16 |
| 6,824,739 | B1* | 11/2004 | Arney ................... G01N 17/00 |
| | | | 204/401 |
| 6,961,285 | B2 | 11/2005 | Niemiec et al. |
| 6,973,371 | B1 | 12/2005 | Benouali |
| 7,252,208 | B1 | 8/2007 | Alvino et al. |
| 7,298,343 | B2 | 11/2007 | Forster et al. |
| 7,828,147 | B2 | 11/2010 | Caracciolo et al. |
| 8,072,334 | B2 | 12/2011 | Forster et al. |
| 8,704,716 | B2 | 4/2014 | Kato et al. |
| 8,751,039 | B1 | 6/2014 | Macoviak et al. |
| 8,960,440 | B1 | 2/2015 | Kronberg |
| 9,172,130 | B2 | 10/2015 | Forster |
| 2001/0028308 | A1 | 10/2001 | De La Huerga et al. |
| 2002/0017996 | A1 | 2/2002 | Niemiec et al. |
| 2002/0111542 | A1 | 8/2002 | Warkentin et al. |
| 2003/0007421 | A1 | 1/2003 | Niemiec et al. |
| 2003/0046563 | A1* | 3/2003 | Ma ........................ G06F 21/85 |
| | | | 713/190 |
| 2003/0063524 | A1 | 4/2003 | Niemiec et al. |
| 2003/0111479 | A1 | 6/2003 | Taneja et al. |
| 2003/0121930 | A1 | 7/2003 | Layer et al. |
| 2004/0078879 | A1* | 4/2004 | Zach ....................... E03D 9/037 |
| | | | 4/227.3 |
| 2005/0062238 | A1 | 3/2005 | Broadfield et al. |
| 2005/0162979 | A1 | 7/2005 | Ostergaard et al. |
| 2005/0237222 | A1 | 10/2005 | Bogash et al. |
| 2005/0241983 | A1 | 11/2005 | Snyder et al. |
| 2005/0252924 | A1 | 11/2005 | Pieper et al. |
| 2005/0256830 | A1 | 11/2005 | Siegel et al. |
| 2006/0071774 | A1 | 4/2006 | Brown et al. |
| 2006/0079996 | A1 | 4/2006 | Benouali |
| 2006/0124656 | A1 | 6/2006 | Popovich, Jr. |
| 2006/0144749 | A1 | 7/2006 | Arnold et al. |
| 2006/0202830 | A1 | 9/2006 | Scharfeld et al. |
| 2007/0018819 | A1 | 1/2007 | Streeb et al. |
| 2007/0246396 | A1 | 10/2007 | Brollier |
| 2008/0223936 | A1 | 9/2008 | Mickle et al. |
| 2009/0210247 | A1 | 8/2009 | Chudy et al. |
| 2009/0218846 | A1* | 9/2009 | Nguyen ................... E05F 15/44 |
| | | | 296/146.9 |
| 2009/0278626 | A1* | 11/2009 | Lee ....................... H03H 7/0115 |
| | | | 333/185 |
| 2009/0278688 | A1 | 11/2009 | Tuttle |
| 2009/0294521 | A1 | 12/2009 | De La Huerga et al. |
| 2009/0309704 | A1 | 12/2009 | Chang et al. |
| 2010/0089791 | A1 | 4/2010 | Rosenbaum et al. |
| 2010/0114367 | A1 | 5/2010 | Barrett et al. |
| 2010/0187243 | A1 | 7/2010 | Layer et al. |
| 2010/0314282 | A1 | 12/2010 | Bowers |
| 2011/0037485 | A1 | 2/2011 | Kiy |
| 2012/0003928 | A1 | 1/2012 | Geboers et al. |
| 2012/0109397 | A1* | 5/2012 | Shim .................... H02J 13/0079 |
| | | | 700/295 |
| 2012/0125994 | A1 | 5/2012 | Heath et al. |
| 2012/0228192 | A1 | 9/2012 | Niven |
| 2012/0229279 | A1 | 9/2012 | Conley et al. |
| 2013/0044007 | A1* | 2/2013 | Paavilainen ............. G09F 3/03 |
| | | | 340/945 |
| 2013/0195326 | A1 | 8/2013 | Bear et al. |
| 2013/0222135 | A1 | 8/2013 | Stein et al. |
| 2013/0285681 | A1 | 10/2013 | Wilson et al. |
| 2014/0039445 | A1 | 2/2014 | Austin et al. |
| 2014/0048442 | A1 | 2/2014 | Maijala et al. |
| 2014/0052467 | A1 | 2/2014 | Maijala et al. |
| 2014/0166529 | A1 | 6/2014 | Fung et al. |
| 2014/0243749 | A1 | 8/2014 | Edwards et al. |
| 2014/0262918 | A1 | 9/2014 | Chu |
| 2014/0288942 | A1 | 9/2014 | Blochet |
| 2014/0340198 | A1 | 11/2014 | Kawase et al. |
| 2014/0354433 | A1 | 12/2014 | Buco et al. |
| 2014/0360898 | A1 | 12/2014 | Kantor et al. |
| 2015/0048100 | A1 | 2/2015 | Dickie et al. |
| 2015/0048102 | A1 | 2/2015 | Dickie et al. |
| 2015/0048170 | A1 | 2/2015 | Forster |
| 2015/0274402 | A1 | 10/2015 | Elliott |
| 2015/0283036 | A1 | 10/2015 | Aggarwal et al. |
| 2015/0286852 | A1 | 10/2015 | Sengstaken, Jr. |
| 2015/0325336 | A1* | 11/2015 | Maples .................. H01B 7/326 |
| | | | 324/539 |
| 2015/0339566 | A1 | 11/2015 | Forster |
| 2015/0347712 | A1 | 12/2015 | Flori et al. |
| 2015/0347713 | A1 | 12/2015 | Seeger |
| 2015/0356845 | A1 | 12/2015 | Forster |
| 2016/0019452 | A1 | 1/2016 | Forster |
| 2016/0106622 | A1 | 4/2016 | Van De Wouw et al. |
| 2016/0132661 | A1 | 5/2016 | Dixit et al. |
| 2016/0137380 | A1 | 5/2016 | Kosaka |
| 2016/0143807 | A1 | 5/2016 | Ika et al. |
| 2016/0147976 | A1 | 5/2016 | Jain |
| 2016/0158108 | A1 | 6/2016 | Gofer et al. |
| 2016/0367435 | A1 | 12/2016 | Ahmadi |
| 2017/0011240 | A1 | 1/2017 | Forster |
| 2017/0053095 | A1 | 2/2017 | Blum et al. |
| 2017/0165151 | A1 | 6/2017 | Schmid et al. |
| 2017/0337157 | A1 | 11/2017 | Rothschild |
| 2018/0012117 | A1 | 1/2018 | Forster |
| 2018/0042105 | A1 | 2/2018 | Anderson |
| 2018/0156756 | A1 | 6/2018 | Forster |
| 2018/0319519 | A1 | 11/2018 | Stange et al. |

FOREIGN PATENT DOCUMENTS

| | | |
|---|---|---|
| EP | 2026253 | 2/2009 |
| WO | 2006002667 | 1/2006 |
| WO | 2008000279 | 1/2008 |
| WO | 2009116108 | 9/2009 |

OTHER PUBLICATIONS

International Search Report and Written Opinion dated Dec. 5, 2016 for International Application No. PCT/US2016/039714 filed Jun. 28, 2016.

International Search Report and Written Opinion dated Oct. 4, 2016 for International Application No. PCT/US2016/039720 filed Jun. 28, 2016.

International Search Report dated Sep. 29, 2015 for International Application No. PCT/US2015/038763 filed Jul. 1, 2015.

International Preliminary Report on Patentability and Written Opinion dated Jan. 10, 2017 for International Application No. PCT/US2015/038763 filed Jul. 1, 2015.

International Preliminary Report on Patentability dated Jun. 13, 2017 for International Application No. PCT/US2015/064888 filed Dec. 10, 2015.

International Search Report and Written Opinion dated Sep. 28, 2017 for International Application No. PCT/US2017/041125 filed Jul. 7, 2017.

(56) References Cited

OTHER PUBLICATIONS

International Preliminary Report on Patentability dated Jan. 8, 2019 for International Application No. PCT/US2017/041125 filed Jul. 7, 2017.

* cited by examiner

METHODS AND SYSTEMS FOR DETERMINING THE TIME AT WHICH A SEAL WAS BROKEN

BACKGROUND

Field of the Disclosure

The present subject matter relates to systems and techniques for determining when a seal on a container or the like was broken. More particularly, the present subject matter relates to the use of an environmentally sensitive material to determine when a seal on a container or the like was broken.

Description of Related Art

It is common to keep employ a sealed container or environment for any of a number of applications. For example, medication is frequently provided in a sealed container, such as a blister pack, which may have a number of individual sealed cells that must be broken to access a dose of medication. It may be advantageous to be able to determine when the seal on a cell was broken, for example, a subject may be under the orders of a doctor or medical care provider to ingest a dose of medication at a particular time. If the subject is not within a facility under the control of the doctor or medical care provider (e.g., a hospital or nursing home), it may be difficult for the doctor or medical care provider to know whether the subject has ingested the medication at the proper time. Accordingly, in this case, it would be advantageous to provide systems and methods that may be used to determine when a particular seal was broken.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a system for determining when a seal of a sealed container was broken includes a sealed container and an electrical circuit. The sealed container includes a seal that separates the interior of the container from the outside environment. An environmentally sensitive conductor of the circuit is positioned within the interior of the sealed container. The conductor has an electrical property with a known initial value that changes in a predictable manner as a function of time and exposure to the outside environment. After the seal has been broken, a present value of the electrical property may be used to determine the time at which the seal was broken and the conductor was exposed to the outside environment.

In another aspect, a system for determining when a seal of a sealed container was broken includes a sealed container and an electrical circuit. The sealed container includes a seal that separates the interior of the container from the outside environment. An environmentally stable conductor and an environmentally sensitive conductor of the circuit are positioned within the interior of the sealed container. The environmentally sensitive conductor has an electrical property with a known initial value that changes in a predictable manner as a function of time and exposure to the outside environment. After the seal has been broken, a present value of the electrical property may be used to determine the time at which the seal was broken and the environmentally sensitive conductor was exposed to the outside environment.

In yet another aspect, a method of determining when a seal of a sealed container was broken includes providing a sealed container having a seal that separates an environmentally sensitive conductor positioned within an interior of the container from an outside environment. The conductor has an electrical property with a known initial value that changes in a predictable manner as a function of time and exposure to the outside environment. The seal is broken, thereby exposing the conductor to the outside environment and allowing the value of the electrical property to change. The time at which the seal was broken is then determined based on the present value and the initial value of the electrical property.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
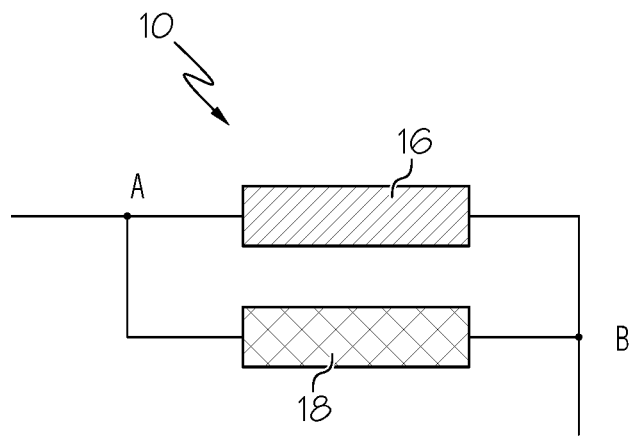
FIG. 1 is a diagrammatic view of an electrical circuit having an environmentally stable conductor and an environmentally sensitive conductor for determining the time at which a seal was broken according to an aspect of the present disclosure.
Figure 2:
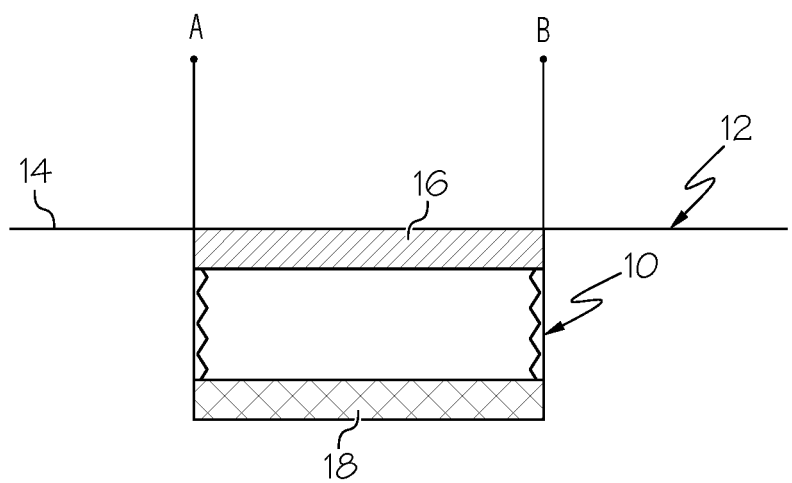
FIG. 2 is a diagrammatic view of the circuit of FIG. 1, with the environmentally stable conductor being incorporated into the seal of a sealed container or package.

According to an aspect of the present disclosure, a system for determining when a seal of a sealed container or package or the like is broken may include a circuit 10 of the type shown in FIG. 1. FIG. 2 illustrates the circuit 10 as positioned within the interior of a sealed container 12, behind a seal 14, as will be described in greater detail herein.

The circuit 10 of FIGS. 1 and 2 includes two conductors 16 and 18 that are electrically connected and positioned within a sealed environment or container 12. In the illustrated embodiment, the conductors 16 and 18 are connected in parallel, but other circuit configurations may also be employed without departing from the scope of the present disclosure. The first conductor 16 is generally environmentally stable, such that at least one electrical property of the first conductor 16 remains generally uniform before and after being exposed to the environment outside of the sealed container 12. The second conductor 18 is environmentally sensitive, such that at least one electrical property of the second conductor 18 will change as a function of time after being exposed to the environment outside of the sealed container 12.

In one embodiment, the first and second conductors 16 and 18 are resistors, with the first conductor 16 having a resistance that remains generally uniform before and after being exposed to the environment outside of the sealed container 12. As for the second conductor 18, it has a resistance that changes as a function of time after being exposed to the environment outside of the sealed container 12. The second conductor 18 may be sensitive to any one or more environmental factors. For example, the second conductor 18 may be configured to react to a liquid or gas in the outside environment by corroding to some degree in order to change its resistance. A second conductor 18 formed of a conductive metal may at least partially convert to an oxide or other non-conducting compound as a mechanism for changing its resistance. An organic conductor (e.g., polyaniline) may have its structure attacked as a mechanism for changing its resistance. Hence, depending on the nature of the outside environment to which the second conductor 18 is to be exposed, a particular material may be selected for the second conductor 18 to elicit a desirable reaction and predictable resistance change.

While, in one embodiment, the conductors 16 and 18 are provided as resistors (and the discussion which follows refers to resistance as the variable electrical property of the second conductor 18), it should be understood that the conductors may be other electrical components. For example, the conductors 16 and 18 may be capacitors (e.g., a second conductor 18 comprising a capacitor with a wet dielectric layer that dries out over time when exposed to the outside environment) or inductors or transistors or diodes, provided that one of the conductors has an electrical property that is variable in a predictable manner in the presence of certain environmental conditions. In another embodiment, the second conductor 18 may be a battery, such as a zinc-air battery, which only produces a voltage when it is exposed to the atmosphere. In such an embodiment, if a current is being drawn by the associated circuit 10, then the voltage of the second conductor/battery 18 will decrease over time in a predictable manner. If conductors other than resistors are used and a variable electrical property other than resistance is monitored (e.g., capacitance or inductance), it may be advantageous for the electrical circuit to be differently configured than as shown in FIGS. 1 and 2.

Figure 3:
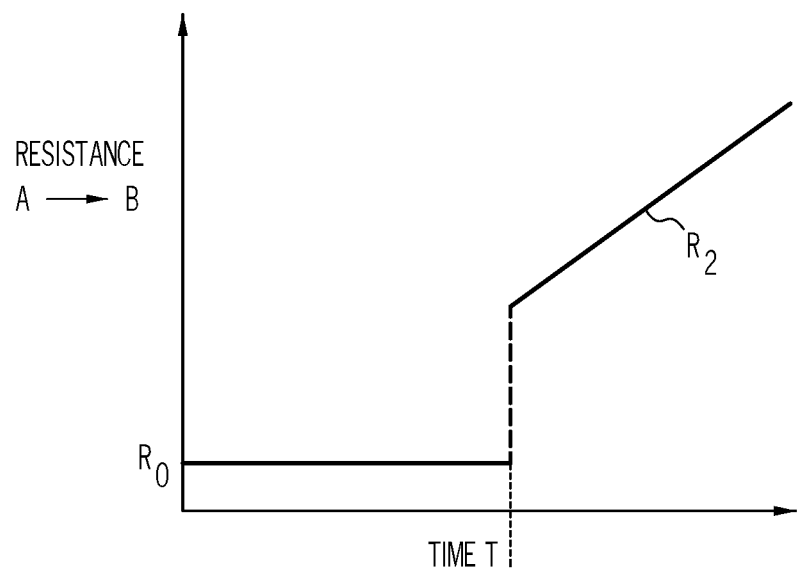
FIG. 3 is a graph illustrating the resistance of the circuit of FIG. 1 before and after the environmentally stable conductor and seal are broken.

If the two conductors 16 and 18 are provided as resistors, placing them in parallel renders the resistance between points A and B equal to a combination of the resistance of the conductors 16 and 18. In particular, the total resistance $R_0$ is equal to the product of the two resistances divided by the sum of the two resistances. FIG. 3 shows how the resistance between points A and B changes as a result of the seal 14 and the first conductor 16 being broken at time T. Before the seal 14 is broken, both conductors 16 and 18 are intact and contributing to the resistance between points A and B, resulting in a resistance of $R_0$.

When the seal 14 and first conductor 16 are broken at time T, the resistance of the first conductor 16 essentially becomes infinite (i.e., an open circuit), as no current will flow therethrough. At that time, all of the current between points A and B will flow through the second conductor 18, such that the resistance between points A and B instantaneously becomes the resistance $R_2$ of the second conductor 18. This is illustrated in FIG. 3 with a stepwise transition from $R_0$ to $R_2$ at time T when the seal 14 and first conductor 16 are broken. For some embodiments, it may be advantageous for the resistance of the first conductor 16 to be much less than the resistance of the second conductor 18 to create a larger step at time T, which may be easier to detect by a monitoring device. In other embodiments the two conductors 16 and 18 may be different circuit components, provided that the second conductor 18 has a time- and environmentally variable electrical property and the first conductor 16 is configured to allow for immediate open/closed detection (which allows an associated monitoring system to see the varying electrical property of the second conductor 18 when the seal 14 has been broken).

FIG. 2 illustrates an exemplary system configuration which ensures that the first conductor 16 is broken at the same time as the associated seal 14. In the system of FIG. 2, the circuit 10 (which includes the first and second conductors 16 and 18) is mounted within a sealed container or package or the like 12 that is separated from the outside environment by a seal or barrier or frame 14. In addition to protecting the environmentally sensitive second conductor 18 from the outside environment, the seal 14 may additionally be an insulative barrier. The first conductor 16 is incorporated into the seal 14, such as by being printed onto the seal 14 or by any other suitable means, and oriented such that breaking the seal 14 necessarily entails also breaking the first conductor 16 without breaking the second conductor 18. In one embodiment, the seal 14 itself may constitute the first conductor 16, such as if the seal 14 is a frangible metallic film having a relatively low resistance.

When the seal 14 and first conductor 16 are broken, the outside environment is allowed to enter into the interior of the sealed container or package 12 and contact the second conductor 18. As the outside environment acts upon the second conductor 18, the resistance (or other variable electrical property) of the second conductor 18 will change over time, as described above. In the embodiment shown in FIG. 3, the resistance of the second conductor 18 changes linearly over time with exposure to the outside environment, but in other embodiments, the resistance or other variable electrical property of the second conductor 18 may change exponentially over time or according to any other profile.

If the initial resistance of the second conductor 18 (before it is acted upon by the outside environment) and the manner in which the resistance of the second conductor 18 changes over time are known, then the resistance of the second conductor 18 at a particular time may be used to determine when the seal 14 and first conductor 16 were broken (i.e., when the second conductor 18 was first exposed to the outside environment and its resistance started to change). For example, assume that the measured resistance of the second conductor 18 is twice that of the initial resistance of the second conductor 18. Assume also that it is known how the resistance of the second conductor 18 will change after being exposed to environmental conditions of the type to which the second conductor 18 is exposed after the seal 14 and first conductor 16 have been broken. With these three pieces of information (i.e., the initial resistance of the second conductor 18, the measured resistance of the second conductor 18, and the way in which the resistance of the second conductor 18 changes as a function of time and exposure to the environment), it is possible to determine how long the second conductor 18 has been exposed to the outside environment. From there, one may count backwards from the current time to ascertain the time at which the seal 14 and the first conductor 16 were broken.

Figure 4:
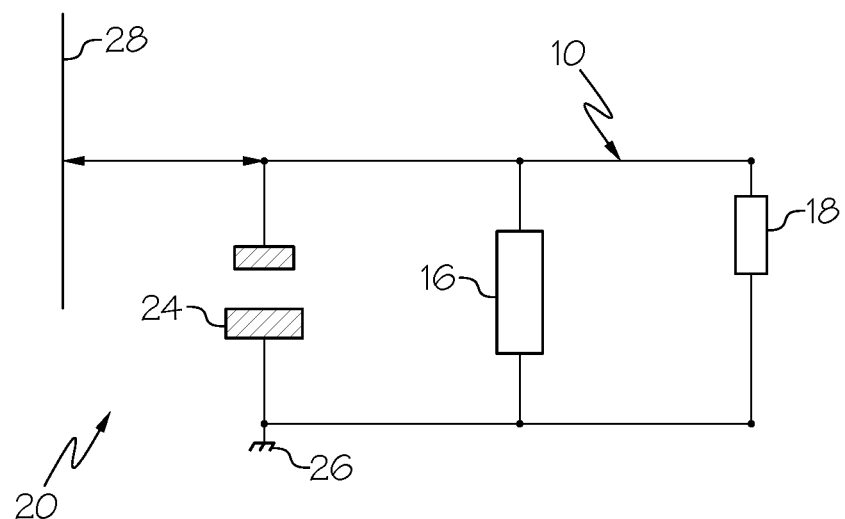
FIG. 4 is a diagrammatic view of the circuit of FIG. 1, with an associated input/output port for determining the resistance of the environmentally sensitive conductor.
Figure 5:
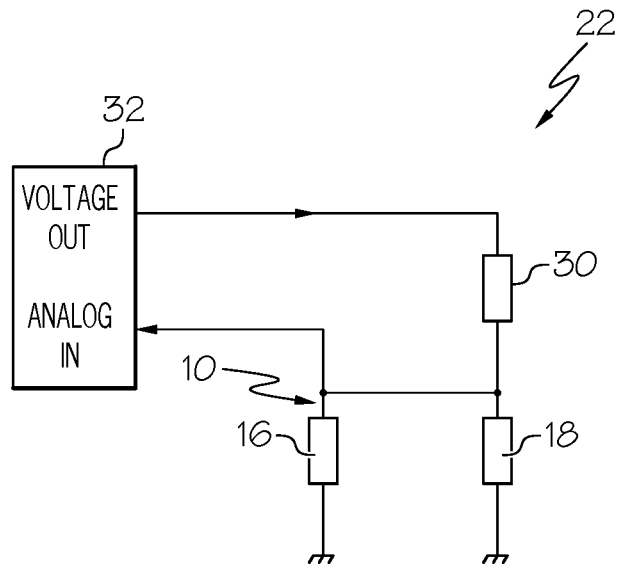
FIG. 5 is a diagrammatic view of the circuit of FIG. 1, with an associated analog-to-digital converter for determining the resistance of the environmentally sensitive conductor.

FIG. 4 and FIG. 5 show two different exemplary systems 20 and 22, respectively, for determining the resistance of the second conductor 18. In the embodiment of FIG. 4, the system 20 includes a circuit 10 of the type shown in FIG. 1, with a first conductor 16 and a second conductor 18 connected in parallel. The conductors 16 and 18 are additionally connected in parallel to a capacitor 24. One end of the conductors 16 and 18 and the capacitor 24 is connected to ground 26, while the other end is connected to an input/output port 28 of a monitoring device, such as a microcontroller or remote frequency identification ("RFID") chip or some other monitoring system.

In use, the input/output port 28 is set as an output and the capacitor 24 is initially charged to or near the system supply voltage $V_0$. The input/output port 28 is then set as an input and the time required for the voltage V on the capacitor 24 to drop from $V_0$ to a threshold value $V_T$ (i.e., a value at which a processor or controller associated with the input/output port 28 reads the input as a digital 0 instead of a digital 1) is determined. If only the second conductor 18 is functional (on account of the first conductor 16 being broken, typically along with an associated seal), current will flow through the second conductor 18, with the voltage V on the capacitor 24 dropping at a rate which depends upon the resistance of the second conductor 18. Knowing the time taken for the voltage V on the capacitor 24 to drop to the threshold value $V_T$ and the relationship between capacitor voltage and conductor resistance, the present resistance of the second conductor 18 may be derived, which may be used to determine the time at which the first conductor 16 and the seal associated therewith were broken, as described above.

Figure 6:
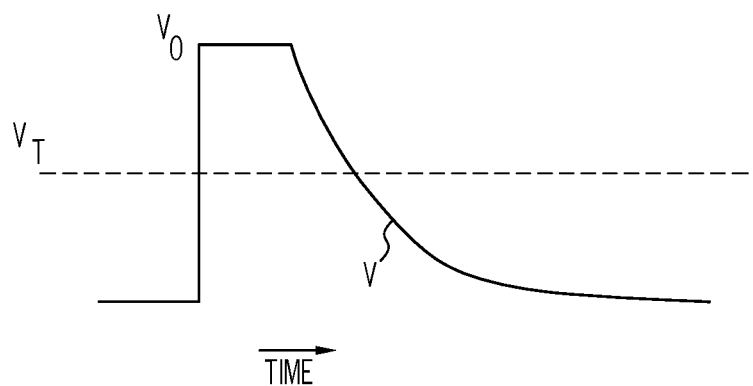
FIG. 6 is a graph of the change in voltage over time for the circuit of FIG. 4.

FIG. 6 illustrates a possible profile for the voltage V on the capacitor 24 of FIG. 4. As described above, an input voltage is applied to charge the capacitor 24 until it reaches a target voltage $V_0$. Thereafter, the input/output port 28 is set as an input and the capacitor 24 is allowed to discharge through the second conductor 18, which decreases the voltage as shown in FIG. 6. Although the voltage across the capacitor 24 is shown as decreasing exponentially with time, the resistance of the second conductor 18 will increase linearly with time. In particular, the voltage V across the capacitor 24 may be expressed by the following equation:

$$V = V_0 e^{\frac{-t}{RC}}, \tag{1}$$

in which t is the amount of time that the capacitor 24 has been discharging, R is the resistance of the second conductor 18 and C is the capacitance of the capacitor 24.

Equation (1) may be rearranged to isolate the voltages as follows:

$$\frac{V}{V_0} = e^{\frac{-t}{RC}}, \tag{2}$$

which may be further rearranged to:

$$\ln\left(\frac{V}{V_0}\right) = \frac{-t}{RC}, \text{ and} \tag{3}$$

$$RC\ln\left(\frac{V}{V_0}\right) = -t. \tag{4}$$

As shown in equation (4), the resistance R is inversely related to the time t by a multiplier which may be expressed as a value k as follows:

$$C\ln\left(\frac{V}{V_0}\right) = k. \tag{5}$$

Finally, equation (4) may be rewritten using k:

$$Rk = -t \tag{6},$$

which shows that resistance R changes linearly with time, i accordance with the resistance profile shown in FIG. 3.

In the embodiment of FIG. 5, the system 22 includes a circuit 10 of the type shown in FIG. 1, with a first conductor 16 and a second conductor 18 connected in parallel. The circuit 10 further includes a resistor 30 in series with the conductors 16 and 18, with the resistor 30 having a known resistance. The system 22 also includes an analog-to-digital converter 32 connected to opposite ends of the resistor 30. In use, a voltage is applied to the circuit 10, with the voltage seen by the analog-to-digital converter 32 being proportional to the ratio of the resistance of the resistor 30 and the resistance of the first and second conductors 16 and 18 (if the first conductor 16 is still intact) or just the second conductor 18 (if the first conductor 16 has been broken) and the voltage applied. If the resistance of the first conductor 16 is much less than the resistance of the second conductor 18, then the voltage seen by the analog-to-digital converter 32 will be very small (e.g., close to zero) when the first conductor 16 is intact. When the first conductor 16 and associated seal have been broken in an embodiment, the parallel conductor arrangement provides a high resistance/open circuit, with current passing through the relatively high resistance second conductor 18 (and the resistor 30), which determines the voltage seen by the analog-to-digital converter 32. When the ratio of the resistances of the resistor 30 and the second conductor 18 has been determined, the present resistance of the second conductor 18 may be derived, because the resistance of the resistor 30 is already known. Then, the resistance of the second conductor 18 may be used to determine the time at which the first conductor 16 and the seal associated therewith were broken, as described above.

While FIGS. 4 and 5 illustrate two possible monitoring devices or components of monitoring devices that may be incorporated into or associated with a circuit according to the present disclosure, it should be understood that other types of monitoring devices and electrical circuit components may also be incorporated into the circuit without departing from the scope of the present disclosure. Preferably, the monitoring device is configured to communicate or otherwise transmit data about the status of the circuit and/or seal (e.g., via Bluetooth or WiFi or UHF or the like) without constituting a continuous power drain. For example, it may be advantageous to omit a real-time clock from the circuit, because such a device typically requires a battery and constitutes a continuous power drain.

In one embodiment, the monitoring device is associated with or incorporates a separate processor or controller or the like that is responsible for data communication. The processor/controller may take any of a variety of suitable forms, from something relatively simple (e.g., a printed electronic device that is configured to communicate with a telephone or other device using a near field communication-compatible "tag talks first" protocol) or something more sophisticated that can accommodate a more complex data link, such as WiFi. It may be advantageous to be particularly aware of power consumption when selecting a paired monitoring device and processor/controller, in which case simpler options (e.g., a simple microcontroller that is running relatively slowly or an RFID link that is powered by the reading device or processor or controller) may be preferred.

Figure 7:
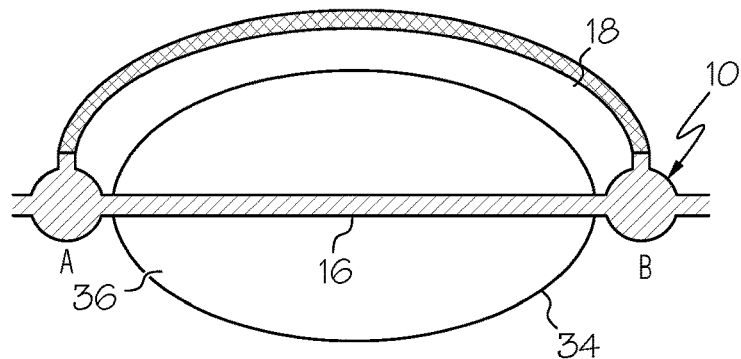
FIG. 7 is a plan view of a medication-containing cell of a medical container incorporating the circuit of FIG. 1 for determining when a seal on the cell was broken.

FIG. 7 illustrates one particular application in which systems according to the present disclosure may be employed. In FIG. 7, a medication container includes at least one medication-containing cell 34. Each cell 34 may be formed of any suitable material but, in one embodiment, each cell is formed of a plastic material or another material that is substantially non-conductive. It may be advantageous for the cells 34 to be formed of a material that is generally rigid, but sufficiently deformable that a human may deform the individual cells using a finger or digital force and manipulation. In a preferred embodiment, the body of the medical container takes the general form of a blister pack, with a thin plastic sheet being provided with a plurality of vacuum-formed depressions or formations that each defines a cell 34 for receiving a dose of medication. While it may be preferred for a medication container having a plurality of cells to be provided with a single plastic sheet that is formed to define all of the cells, it is also within the scope of the present disclosure for the cells of a single medication container to be separately or non-integrally formed.

Each cell 34 is closed or overlaid by a cover or seal 36 through which medication within the cell 34 may be accessed. In one embodiment, the seal 36 is a thin sheet of material, such as a metallic foil or the like, which may be broken to allow a medication to pass out of the cell 34. In such an embodiment, a base of the cell 34 may be pressed toward the frangible seal 36 by a user until the force on the seal 36 exceeds the strength of the seal 36, at which point the seal 36 breaks and the medication may be removed from the cell 34. Alternatively, the cell 34 may remain untouched, while the seal 36 is directly engaged and broken to remove medication from the cell 34. If the medication container is provided with a plurality of cells, it may be preferred for a single seal to overlay all of the cells, but it is also within the scope of the present disclosure for two or more cells of the same medication container to be provided with separate seals. For example, in one embodiment, different cells are each overlaid by separate, non-frangible (e.g., hinged) covers or seals.

In the embodiment of FIG. 7, a circuit 10 of the type shown in FIG. 1 can be incorporated into the medication container. In such an embodiment, the circuit 10 is arranged such that the first conductor 16 extends over the cell 34, with the seal 36, while the second conductor 18 is positioned adjacent to the cell 34 without passing over the cell 34. In a particular embodiment, the circuit 10 may be printed onto the seal 36 or otherwise integrated into the seal 36, but it also within the scope of the present disclosure for the circuit 10 to be separately provided from the seal 36. In another embodiment, the first conductor 16 may be the foil cover that seals the cell 34, with such a first conductor 16 providing a low resistance acting as a virtual short (when intact) and later having an effectively infinite resistance (when broken) which directs all current through the second conductor 18, allowing the monitoring device or system to "see" the second conductor 18. The second conductor 18 may be fabricated with a barrier that protects the second conductor 18 during manufacturing, with the barrier being configured to be breached when the seal 36 is secured (e.g., by heat sealing) to the body of the medication container. Although not illustrated in FIG. 7, the circuit 10 may include additional components, such as an input/output port of the type shown in FIG. 5 and/or an analog-to-digital converter of the type shown in FIG. 6 or other suitable monitoring device component.

Accessing a cell 34 through the seal 36 to remove the medication disrupts the circuit 10 at the location of the cell 34, particularly by severing or breaking the first conductor 16 at the cell 34. Breaking the seal 36 and the first conductor 16 exposes the second conductor 18 to the outside environment, causing the resistance of the second conductor 18 to change as a function of time. As described above in greater detail, the resistance of the second conductor 18 at a particular time may be measured and then used to determine the time at which the seal 36 of the medication container was broken. If the medication container includes a plurality of cells, each may include its own associated circuit, thereby allowing a doctor or medical care provider to separately monitor the status of each cell. This may be especially advantageous if the various cells contain different medications that are to be ingested by a subject at particular times.

Figure 8:
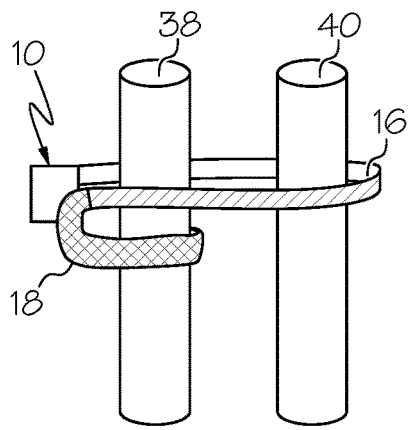
FIG. 8 is a perspective view of two portions of a container, with an environmentally stable conductor associated with both portions and an environmentally sensitive conductor associated with one portion for determining when the container was opened.

FIG. 8 illustrates another particular application for systems according to the present disclosure. In FIG. 8, a sealed package or container includes at least two portions or handles 38 and 40, with the package or container being configured to be opened or unsealed by moving the handles 38 and 40 apart. In an embodiment, a circuit 10 of the type shown in FIG. 1 is incorporated into the package or container by wrapping or otherwise securing the first conductor 16 to both handles 38 and 40, while wrapping or otherwise securing the second conductor 18 to only one of the handles 38. Although not illustrated in FIG. 8, the circuit 10 may include additional components, such as an input/output of the type shown in FIG. 5 and/or an analog-to-digital converter of the type shown in FIG. 6 or other suitable monitoring device component.

Preferably, the first conductor 16 is frangible and configured such that, when the handles 38 and 40 are separated apart to break the seal on the package or container, the first conductor 16 will also break. Breaking the seal and the first conductor 16 exposes the second conductor 18 to the outside environment, causing the resistance of the second conductor 18 to change as a function of time. As described above in greater detail, the resistance of the second conductor 18 at a particular time may be measured and then used to determine the time at which the seal of the package or container was broken. In a particular embodiment, the first conductor 16 is associated with a sealed passage that exposes the second conductor 18 to atmospheric oxygen when the seal is broken, but the second conductor 18 may be configured to react to other outside environmental conditions without departing from the scope of the present disclosure. Regardless of the particular embodiment, a system of the type shown in FIG. 8 may be advantageous when shipping a package or container that becomes unsealed during transit, in that it becomes possible to determine whose custody the package or container was in when the seal was broken, which information may be used to determine who bears the responsibility for replacing or paying for the unsealed item.

Figure 9:
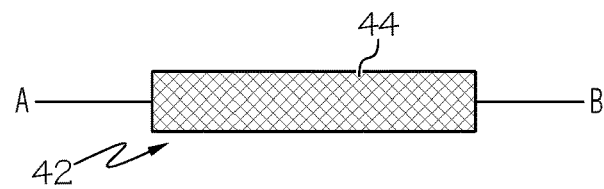
FIG. 9 is a diagrammatic view of an electrical circuit having a single, environmentally sensitive conductor for determining the time at which a seal was broken according to an aspect of the present disclosure.

FIG. 9 illustrates an alternative embodiment of a system for determining when a seal has been broken. In the embodiment of FIG. 9, the system includes an electrical circuit 42 including a single conductor 44, as opposed to the dual-conductor circuit 10 of FIG. 1. Providing a circuit 42 with only one conductor 44 may result in a system that is less expensive than a system incorporating two conductors. Furthermore, another advantage of a system of the type shown in FIG. 9 is that an initial calibration of the conductor 44 may be carried out in the sealed state, with the information being stored in either a device (e.g., an RFID chip) local to the circuit 42 or in a separate database or controller/processor associated with the identity of the system.

The conductor 44 is environmentally sensitive, such that at least one of its electrical properties will change as a function of time after being exposed to the environment outside of a sealed container, similar to the second conductor 18 of FIG. 1. In one embodiment, the conductor 44 is a resistor having a resistance that changes as a function of time after being exposed to the environment outside of the sealed container but, as described above in greater detail with regard to the second conductor 18 of FIGS. 1 and 2, the conductor 44 may be any other suitable electrical circuit component. The conductor 44 may be sensitive to any one or more environmental factors. For example, the conductor 44 may be configured to react to a liquid or gas in the outside environment by corroding to some degree in order to change its resistance. A conductor 44 formed of a conductive metal may at least partially convert to an oxide or other non-conducting compound as a mechanism for changing its resistance. An organic conductor (e.g., polyaniline) may have its structure attacked as a mechanism for changing its resistance. Hence, depending on the nature of the outside environment to which the conductor 44 is to be exposed, a particular material may be selected for the conductor 44 to elicit a desirable reaction and predictable resistance change.

The initial resistance of the conductor 44 is known, with the resistance of the conductor 44 being equal to this initial resistance when the seal of the associated sealed container or package is intact. When the seal is broken and the conductor 44 is exposed to the outside environment, the resistance of the conductor 44 will increase according to any of a number of possible profiles, such as by increasing linearly or exponentially with time and exposure to the outside environment. Although not illustrated in FIG. 9, the circuit 44 may include additional components, such as a monitoring device (e.g., a device having an input/output port of the type shown in FIG. 4 or an analog-to-digital converter of the type shown in FIG. 5) paired with a processor or controller or the like for determining the resistance of the conductor 44 both before and after the seal has been broken.

Providing only an environmentally sensitive conductor 44 (rather than also incorporating an environmentally stable conductor into the circuit 42) may make it more difficult to detect the change in electrical property of the conductor 44, due to the elimination of a clear step change in the property, of the type shown in FIG. 3. However, a properly selected monitoring device and processor/controller will be capable of determining the current value of the electrical property and then tracking back to the time of the unsealing event using knowledge of the behavior of the conductor 44 in the presence of the outside environment. Preferably, the conductor 44 is selected to have an electrical property that changes rapidly upon its initial exposure to the outside environment to make it easier for the monitoring device and processor/controller to determine the time at which the seal was broken. It may be especially preferred for the value of the electrical property to initially change quickly (for better accuracy for shorter time periods) and change more slowly over time (resulting in diminished accuracy at longer time periods, but an improved lifespan for the system). Such an embodiment may be advantageous for clinical purposes, in which short term accuracy (e.g., whether a tablet was taken ten minutes ago vs. thirty minutes ago) is more important than long term accuracy (e.g., whether a table was taken eleven hours ago or twelve hours ago). This may also be true for systems according to the present disclosure which incorporate two conductors, rather than a single conductor.

Figure 10:
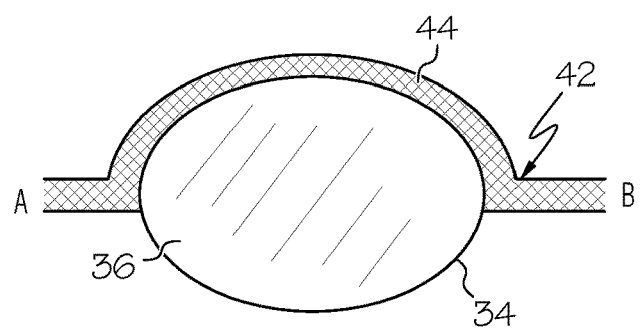
FIG. 10 is a plan view of a medication-containing cell of a medical container incorporating the circuit of FIG. 9 for determining when a seal on the cell was broken.

FIG. 10 illustrates one particular application in which a single-conductor system of the type shown in FIG. 9 may be employed. In FIG. 10, a medication container of the type described above with respect to FIG. 7 is provided, with at least one medication-containing cell 34. Rather than having an environmentally stable conductor associated with a seal 36 extending over the cell 34 and an environmentally sensitive conductor positioned adjacent to the cell 34 without passing over the cell 34, this illustrated embodiment includes only an environmentally sensitive conductor 44 positioned adjacent to the cell 34 without passing over the cell 34. Similar to the embodiment of FIG. 7, the conductor 44 may be fabricated with a barrier that protects the conductor 44 during manufacturing, with the barrier being configured to be breached when the seal 36 is secured (e.g., by heat sealing) to the body of the medication container. Additionally, although not illustrated in FIG. 10, the circuit 42 may include additional components, such as an input/output port of the type shown in FIG. 5 and/or an analog-to-digital converter of the type shown in FIG. 6 or other suitable monitoring device component.

Accessing a cell 34 through the seal 36 to remove the medication exposes the conductor 44 to the outside environment, causing the resistance of the conductor 44 to change as a function of time. As described above in greater detail, the resistance of the conductor 44 at a particular time may be measured and then used to determine the time at which the seal 36 of the medication container was broken. If the medication container includes a plurality of cells, each may include its own associated circuit, thereby allowing a doctor or medical care provider to separately monitor the status of each cell. This may be especially advantageous if the various cells contain different medications that are to be ingested by a subject at particular times.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A system for determining when a seal of a sealed container was broken, comprising:
    a sealed container including a seal that separates an interior of the sealed container from an outside environment; and an electrical circuit including an environmentally sensitive conductor positioned within the interior of the sealed container and having an electrical property with a known initial value that changes in a predictable manner as a function of time and exposure to the outside environment, such that a present value of the electrical property is determined;

wherein the electrical circuit further includes a capacitor, a monitoring device for communicating or transmitting the present value of the electrical property of the environmentally sensitive conductor without a continuous power drain, and an environmentally stable conductor configured to allow for open/closed detection associated with the seal such that breaking the seal also breaks the environmentally stable conductor, and the capacitor is connected to the environmentally sensitive conductor, the environmentally stable conductor, and an input/output port of the monitoring device, wherein the capacitor is connected in parallel to the environmentally sensitive conductor and the environmentally stable conductor.

2. The system of claim 1, wherein the environmentally sensitive conductor is a resistor and the electrical property is resistance.

3. The system of claim 1, wherein the input/output port is configured to charge the capacitor to a target voltage when the input/output port is set as an output.

4. The system of claim 1, wherein the monitoring device comprises one of a microcontroller or remote frequency identification chip.

5. The system of claim 1, wherein the environmentally sensitive conductor and the environmentally stable conductors are resistors connected in parallel and the electrical property is resistance.

6. The system of claim 1, wherein
the sealed container comprises a medication container, with the interior of the medication container comprising a sealed, medication-containing cell,
the environmentally stable conductor is associated with the seal and extends across the cell, and
the environmentally sensitive conductor does not extend across the cell.

7. The system of claim 1, wherein
the sealed container includes two handles configured to be separated to break the seal,
the environmentally stable conductor is secured to the two handles, and
the environmentally sensitive conductor is secured to one of the two handles.

8. The system of claim 1, wherein the capacitor is configured to discharge through the environmentally sensitive conductor when the input/output port is set as an input.

9. The system of claim 1, wherein the electrical circuit is positioned within the interior of the sealed container behind the seal.

10. A method of determining when a seal of a sealed container was broken, comprising:
providing a sealed container including a seal comprising an electrical circuit including an environmentally stable conductor configured to allow for open/closed detection printed onto the seal that separates an environmentally sensitive conductor positioned within an interior of the sealed container from an outside environment, wherein the electrical circuit further comprises a capacitor connected in parallel to the environmentally sensitive conductor and the environmentally stable conductor;
breaking the seal, thereby exposing the environmentally sensitive conductor to the outside environment;
determining a present value of an electrical property of the environmentally sensitive conductor which has a known initial value and changes in a predictable manner as a function of time and exposure to the outside environment;
determining the time at which the seal of the sealed container was broken based on the present value and the initial value of the electrical property of the environmentally sensitive conductor;
communicating or transmitting the present value of the electrical property of the environmentally sensitive conductor without a continuous power drain; and
communicating or transmitting data about status of the circuit and/or seal through a configured monitoring device.

11. The method of claim 10, wherein the environmentally sensitive conductor is a resistor and the electrical property is resistance.

12. The method of claim 10, wherein said breaking the seal includes breaking the environmentally stable conductor electrically coupled to the environmentally sensitive conductor.

13. The method of claim 10, further comprising applying an input voltage to charge the capacitor before the step of breaking the seal.

14. The method of claim 10, wherein the electrical circuit further comprises a resistor connected in series with the environmentally sensitive conductor and the environmentally stable conductor.

15. The method of claim 14, wherein an analog-to-digital converter is connected to opposite ends of the resistor.

16. The method of claim 15, further comprising applying a voltage to the electrical circuit.

* * * * *